United States Patent
Saeda et al.

(10) Patent No.: US 11,178,293 B2
(45) Date of Patent: Nov. 16, 2021

(54) MOBILE TERMINAL, STORAGE MEDIUM AND CONTROL METHOD TO REMOTELY OPERATE AN INFORMATION PROCESSING APPARATUS

(71) Applicant: SHARP KABUSHIKI KAISHA, Sakai (JP)

(72) Inventors: Masao Saeda, Sakai (JP); Yoshinori Nagata, Sakai (JP); Yukako Nii, Sakai (JP); Miho Yamamura, Sakai (JP); Michiko Katsuki, Sakai (JP); Masaki Kondo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/096,739

(22) Filed: Nov. 12, 2020

(65) Prior Publication Data
US 2021/0152699 A1   May 20, 2021

(30) Foreign Application Priority Data

Nov. 15, 2019  (JP) .............................. JP2019-207156

(51) Int. Cl.
*G06F 3/12*    (2006.01)
*H04N 1/00*    (2006.01)

(52) U.S. Cl.
CPC ....... *H04N 1/00307* (2013.01); *H04N 1/0048* (2013.01); *H04N 1/00469* (2013.01)

(58) Field of Classification Search
None
See application file for complete search history.

(56) References Cited

U.S. PATENT DOCUMENTS

| 5,699,494 | A  | * | 12/1997 | Colbert | G06F 3/1204 |
| | | | | | 358/1.15 |
| 7,576,877 | B2 | * | 8/2009 | Tanaka | H04N 1/00408 |
| | | | | | 358/1.1 |
| 9,678,596 | B2 | * | 6/2017 | Miyazaki | G06F 3/0488 |
| 9,794,437 | B2 | * | 10/2017 | Kubo | H04N 1/00493 |
| 2012/0023451 | A1 | * | 1/2012 | Kuroyanagi | G06F 8/38 |
| | | | | | 715/835 |
| 2012/0212761 | A1 | * | 8/2012 | Kuroyanagi | H04N 1/00408 |
| | | | | | 358/1.13 |
| 2013/0111238 | A1 | * | 5/2013 | Takahashi | H04N 1/00204 |
| | | | | | 713/320 |
| 2014/0268225 | A1 | * | 9/2014 | Shibukawa | H04N 1/00204 |
| | | | | | 358/1.15 |
| 2017/0111409 | A1 | * | 4/2017 | Kokubo | H04L 65/1059 |

FOREIGN PATENT DOCUMENTS

JP           2017-228872 A       12/2017

* cited by examiner

*Primary Examiner* — Henok Shiferaw
(74) *Attorney, Agent, or Firm* — ScienBiziP, P.C.

(57) ABSTRACT

An information processing system includes an image forming apparatus being an example of an information processing apparatus, and a user terminal. The image forming apparatus and the user terminal are directly and communicably connected by radio communication or the like. A remote operation screen for remotely operating the image forming apparatus is displayed on a display of the user terminal. On the remote operation screen, an additional function notifier is provided for notifying a user of existence of an additional function that is an operation function executable with an input device of the image forming apparatus to be operated, and is not executable with the remote operation screen in an initial state.

9 Claims, 13 Drawing Sheets

SECOND REMOTE OPERATION SCREEN 240

SECOND REMOTE OPERATION SCREEN 240

MOBILE TERMINAL, STORAGE MEDIUM AND CONTROL METHOD TO REMOTELY OPERATE AN INFORMATION PROCESSING APPARATUS

BACKGROUND OF THE INVENTION

Field of the Invention

The present invention relates to a mobile terminal, a storage medium, and a control method, and particularly relates to, for example, a mobile terminal, a storage medium, and a control method, by which it is possible to remotely operate an information processing apparatus.

Description of the Background Art

An example of this type of conventional technology is disclosed in Japanese Unexamined Patent Application Publication No. 2017-228872. When a mobile terminal for remote operation of an image forming apparatus according to the conventional technology is used for the remote operation of an image forming apparatus, the mobile terminal executes an operation screen program for a standard machine model different from a machine model of the image forming apparatus to display an operation screen for the standard machine model, generates a command according to a user input operation with the operation screen, and transmits the command to the image forming apparatus. It is noted that on the operation screen for the standard machine model displayed on the mobile terminal, among operation keys included in the operation screen for the standard machine model, a key not corresponding to any one of operation keys included in an operation screen of the image forming apparatus to be operated is disabled.

However, in the mobile terminal for remote operation of an image forming apparatus according to the conventional technology, there is not displayed a key not corresponding to any one of operation keys included in an operation screen for the standard machine model displayed on the mobile terminal, that is, an operation key executable by the image forming apparatus and not executable with an operation screen for the mobile terminal, among operation keys included in the operation screen of the image forming apparatus to be operated. That is, in the mobile terminal for remote operation of an image forming apparatus according to the conventional technology, there is a problem in that some of the operation keys executable by the image forming apparatus cannot be utilized, and there is room for improvement in operability.

Accordingly, a main object of the present invention is to provide a novel mobile terminal, storage medium, and control method.

Another object of the present invention is to provide a mobile terminal, a storage medium, and a control method, by which it is possible to improve the operability.

SUMMARY OF THE INVENTION

A first aspect of the present invention is a mobile terminal including a display, a touch panel provided on a display surface of the display, a storage that stores a remote operation screen for the mobile terminal for remotely operating an information processing apparatus to be operated, and a communicator that communicates with the information processing apparatus, and the mobile terminal includes a display controller, a transmitter, a first determiner, and a notifier. The display controller displays the remote operation screen on the display. The transmitter transmits, to the information processing apparatus, an operation instruction corresponding to an input operation with the remote operation screen. The first determiner compares an operation function executable with an input device of the information processing apparatus with an operation function executable with the remote operation screen in an initial state, and determines whether there is an additional function that is an operation function executable by the information processing apparatus, and is not executable with the remote operation screen in the initial state. The notifier notifies existence of the additional function, on the remote operation screen if the first determiner determines that there is the additional function.

A second aspect of the present invention is the mobile terminal according to the first aspect, in which the display controller displays an extended operation section including an operation key assigned to the additional function, on the remote operation screen.

A third aspect of the present invention is the mobile terminal according to the second aspect, in which the display controller displays the extended operation section to overlap on a part of the remote operation screen.

A fourth aspect of the present invention is the mobile terminal according to the second aspect, in which the remote operation screen includes an operation area imitating the input device of the information processing apparatus and a margin area being a portion other than the operation area, and the display controller displays the extended operation section, in the margin area.

A fifth aspect of the present invention is the mobile terminal according to the fourth aspect, in which the display controller causes the margin area to display an enlarged image obtained by enlarging a part of the operation area.

A sixth aspect of the present invention is the mobile terminal according to any one of the first to fifth aspects, further including an operation storage that stores a content of an operation on the remote operation screen as a routine operation in the storage, and a second determiner that determines whether to read the routine operation stored in the storage, and the transmitter transmits, to the information processing apparatus, an operation instruction corresponding to the routine operation if the second determiner determines to read the routine operation.

A seventh aspect of the present invention is the mobile terminal according to any one of the first to sixth aspects, further including a third determiner that compares an operation function executable with an input device of the information processing apparatus with an operation function executable with the remote operation screen and determines whether there is an unusable function that is an operation function executable with the remote operation screen, and is not executable by the information processing apparatus, and a disabler that disables the unusable function on the remote operation screen if the third determiner determines that there is the unusable function.

An eighth aspect of the present invention is a non-transitory storage medium for storing a control program of a mobile terminal including a display, a touch panel provided on a display surface of the display, a storage that stores a remote operation screen for remotely operating an information processing apparatus to be operated, and a communicator that communicates with the information processing apparatus, and the control program causes a processor of the information processing apparatus to execute displaying the remote operation screen on the display, transmitting, to the information processing apparatus, an operation instruction corresponding to an input operation with the remote operation screen, comparing an operation function executable with an input device of the information processing apparatus with a basic operation function executable with the remote operation screen in an initial state and determining whether there is an additional function that is an operation function executable by the information processing apparatus, and is not executable with the remote operation screen in the initial state, and notifying existence of the additional function, on the remote operation screen if it is determined that there is the additional function in the comparing and determining.

A ninth aspect of the present invention is a control method for a mobile terminal including a display, a touch panel provided on a display surface of the display, a storage that stores a remote operation screen for remotely operating an information processing apparatus to be operated, and a communicator that communicates with the information processing apparatus, and the control method includes (a) displaying the remote operation screen on the display, (b) transmitting, to the information processing apparatus, an operation instruction corresponding to an input operation with the remote operation screen, (c) comparing an operation function executable with an input device of the information processing apparatus with a basic operation function executable with the remote operation screen in an initial state and determining whether there is an additional function that is an operation function executable by the information processing apparatus, and is not executable with the remote operation screen in an initial state, and (d) notifying existence of the additional function, on the remote operation screen if it is determined in the (c) that there is the additional function.

According to the present invention, the operability can be improved by a mobile terminal remotely operating a plurality of information processing apparatuses having different functions and operation methods.

The above object, the other objects, features, and advantages of the present invention will be more apparent from the following detailed description of embodiments with reference to the drawings.

DESCRIPTION OF THE PREFERRED EMBODIMENTS

First Embodiment

Figure 1:
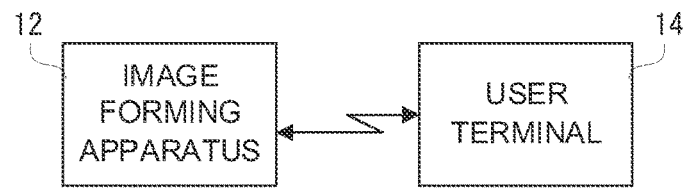
FIG. 1 is a diagram illustrating an example of a configuration of an information processing system according to the present invention.

FIG. 1 is a diagram illustrating an example of a configuration of an information processing system 10 according to the present invention. Referring to FIG. 1, the information processing system 10 according to a first embodiment of the present invention includes an image forming apparatus 12 and a user terminal (mobile terminal) 14. The image forming apparatus 12 and the user terminal 14 are directly and communicably connected by radio communication or the like, which will be described in detail later.

It is noted that although FIG. 1 illustrates one image forming apparatus 12 and one user terminal 14, the information processing system 10 may include two or more image forming apparatuses 12 and two or more user terminals 14.

The image forming apparatus 12 is an example of an information processing apparatus being a communication target of the user terminal 14, and the image forming apparatus 12 is a multifunction peripheral (MFP) including a copying function, a printer function, a scanner function, and a facsimile (FAX) function. It is noted that the present invention is applicable not only to such a multifunction peripheral, but also to another information processing apparatus such as a copying machine (copier), a printing apparatus (printer), a facsimile apparatus, and an image reading apparatus (scanner).

Figure 2:
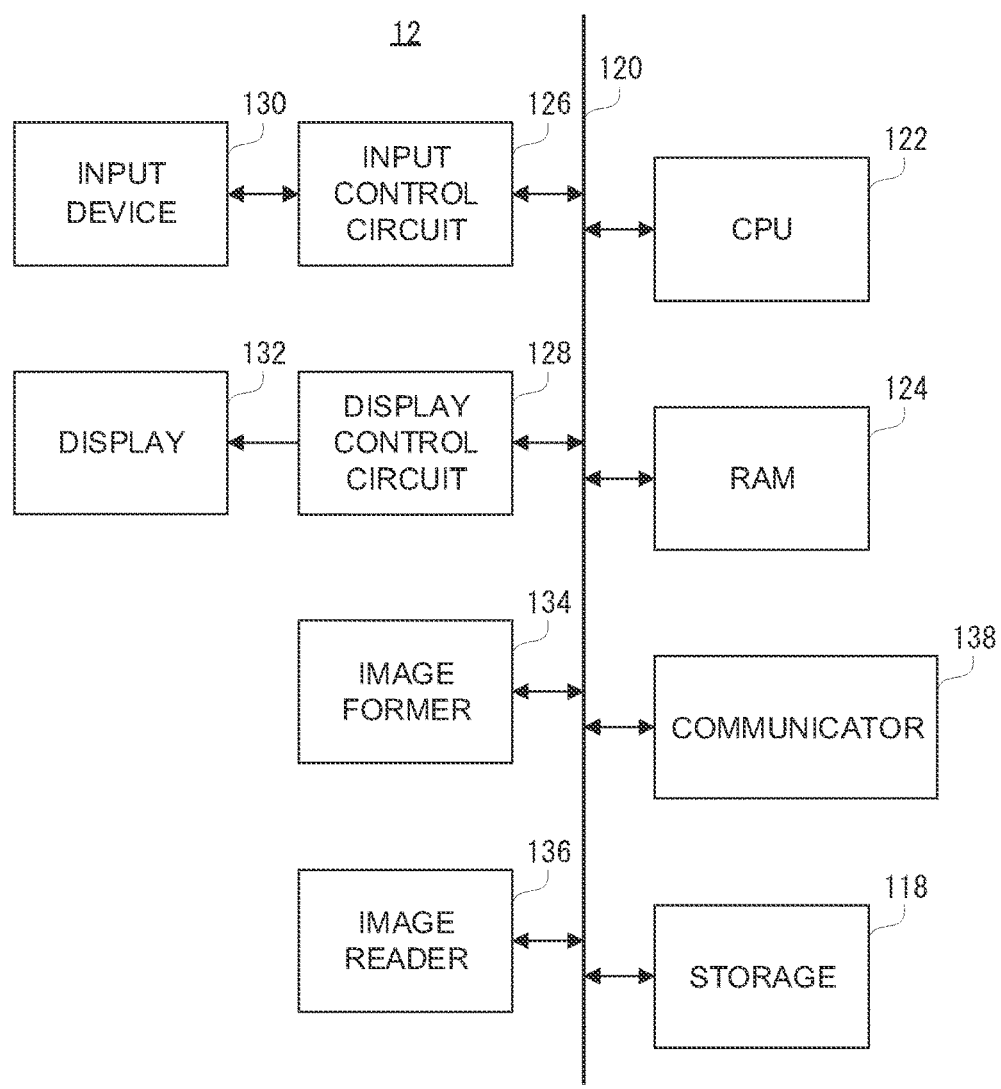
FIG. 2 is a block diagram illustrating an electrical configuration of an image forming apparatus illustrated in FIG. 1.

FIG. 2 is a block diagram illustrating an electrical configuration of the image forming apparatus 12 illustrated in FIG. 1. Referring to FIG. 2, the image forming apparatus 12 includes a CPU 122. The CPU 122 is connected with a RAM 124, an input control circuit 126, a display control circuit 128, an image former 134, an image reader 136, a communicator 138, and a storage 118, via a bus 120. An input device 130 is connected to the input control circuit 126, and a display 132 is connected to the display control circuit 128.

The CPU 122 manages the overall control of the image forming apparatus 12. The RAM 124 is used as a work area and a buffer area of the CPU 122.

The storage 118 is a main storage device of the image forming apparatus 12, and employs a non-volatile memory such as an HDD and an EPPROM. The storage 118 stores data for a control program for controlling operations of components of the image forming apparatus 12 by the CPU 122, image (display image) data for various types of screens, data necessary for executing the control program, and the like. It is noted that the storage 118 may be configured to include the RAM 124. The same applies to a storage 156 of the user terminal 14 described below.

The input device 130 receives an input operation to the image forming apparatus 12, and includes a touch panel, for example. The touch panel is a general-purpose touch panel, and may employ any type of touch panel such as an electrostatic capacitance type, an electromagnetic induction type, a resistance film type, and an infrared type. The touch panel may be provided on a display surface of the display 132 or may be provided separately from the display 132. A touch display in which the touch panel and the display 132 are integrally formed may be provided. If the touch panel is provided on the display surface of the display 132, the display 132 displays a Graphical User Interface (GUI) including software keys (operation keys) such as various types of buttons and icons. In this case, an input operation is received via the GUI (operation screen). The input device 130 may include a hardware operation button (hardware key) instead of or in addition to the touch panel.

It is noted that the software key refers to a key or an icon reproduced in a manner of a software on the display surface of the display 132, for example. On the other hand, the hardware key refers to a key or a push button provided as a physical device.

The input control circuit 126 outputs, to the CPU 122, an operation signal or operation data corresponding to an input operation to the input device 130. If the input device 130 includes a touch panel, the input control circuit 126 applies a voltage or the like required for the touch panel, detects a touch operation (touch input) within an effective touch range of the touch panel, and outputs, to the CPU 122, touch coordinate data indicating a position of the touch input. If the input device 130 includes a hardware key, the input control circuit 126 outputs, to the CPU 122, an operation signal or operation data corresponding to an operation on the hardware key.

The display control circuit 128 includes a GPU, a VRAM, and the like. The GPU, under an instruction from the CPU 122, generates, in the VRAM, display image data for displaying various operation screens on the display 132 by using image generation data 304b (see FIG. 11) stored in the RAM 124, and outputs the generated display image data to the display 132. An operation screen such as a home screen 160 (see FIG. 4) being a screen for selecting a desired job from various types of jobs executable by the image forming apparatus 12 is displayed on the display 132. In the first embodiment, the job refers to scanning, copying (including scanning of a document), facsimile (FAX), and the like. A liquid crystal display (LCD) or an electro-luminescence (EL) display may be employed for the display 132.

The image former (printing device) 134 is a general-purpose laser printer, includes a photoconductor, a charger, an exposure device, a developing device, a transfer device, and a fixing device, and prints an image corresponding to print data processed by an image processing circuit onto recording paper (a sheet), or the like. The image former 134 may be configured by an ink jet printer instead of the laser printer.

It is noted that although a detailed description is omitted, the image former 134 is equipped with a color printing function, and includes an image formation station including a photoconductor, a charger, a developing device, and the like for each color of yellow (Y), magenta (M), cyan (C), and black (K).

The image reader 136 includes a light source, a plurality of mirrors, an imaging lens, a line sensor, and the like. The image reader 136 exposes a document surface with light from the light source, and guides reflected light reflected from the document surface to the imaging lens by the plurality of mirrors. The reflected light is imaged on a light receiving element of the line sensor by the imaging lens. The line sensor detects luminance and chromaticity of the reflected light imaged on the light receiving element to generate read image data, based on an image on the document surface.

The communicator 138 includes a wired communication circuit or a radio communication circuit. The wired communication circuit is a circuit for performing wired communication conforming to a known communication standard such as Ethernet (registered trademark), and performs a process of transmitting and receiving communication data to and from an external computer via a network such as the Internet. The radio communication circuit is a circuit for performing radio communication such as WiFi, and is connected to an antenna. The radio communication circuit uses radio communication such as WiFi, based on a radio communication scheme conforming to a known communication standard such as IEEE 802.11, to perform a process for transmitting and receiving communication data transmitted and received to and from an external computer. The communicator 138 uses radio communication to perform a process for transmitting and receiving communication data transmitted and received to and from the user terminal 14. It is noted that the image forming apparatus 12 may be connected to a network such as the Internet. In this case, the communicator 138 performs a process of transmitting and receiving communication data transmitted and received to and from an external computer, via a network.

It is noted that the electrical configuration of the image forming apparatus 12 illustrated in FIG. 2 is merely an example, and is not limiting. For example, a hardware keyboard serving as another inputter may be connected to the image forming apparatus 12.

The user terminal 14 is, for example, a mobile-type (portable-type) terminal (mobile terminal) that is portable, such as a general-purpose smartphone, a future phone, or a tablet PC, and has various functions such as a call function, an e-mail function, and a browser function.

Figure 3:
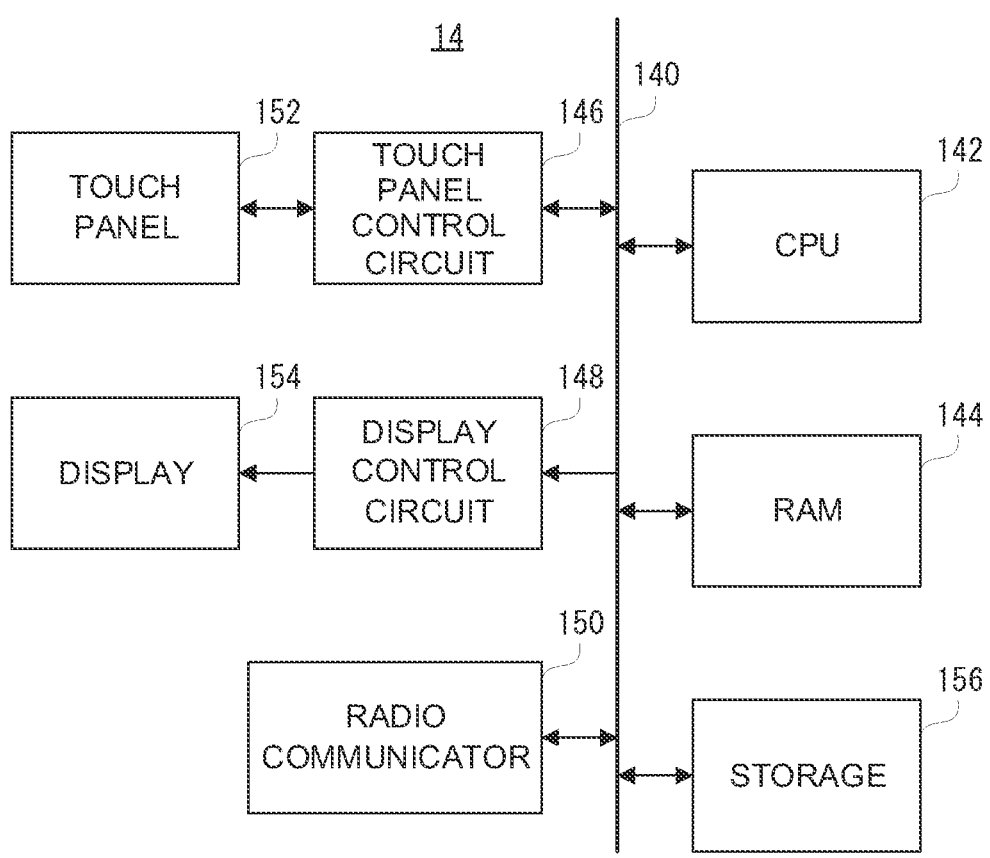
FIG. 3 is a block diagram illustrating an electrical configuration of a user terminal illustrated in FIG. 1.

FIG. 3 is a block diagram illustrating an electrical configuration of the user terminal 14 illustrated in FIG. 1. Referring to FIG. 3, the user terminal 14 according to the first embodiment includes a CPU 142. The CPU 142 is connected with a RAM 144, a touch panel control circuit 146, a display control circuit 148, a radio communicator 150, and the storage 156, via a bus 140. The touch panel control circuit 146 is connected with a touch panel 152, and the display control circuit 148 is connected with a display 154.

The CPU 142 manages the overall control of the user terminal 14. The RAM 144 is used as a work area and a buffer area of the CPU 142.

The touch panel control circuit 146 applies a voltage or the like necessary for the touch panel 152, and if a touch input is detected, the touch panel control circuit 146 outputs, to the CPU 142, touch coordinate data indicating a position of the touch input.

The display control circuit 148 includes a GPU, a VRAM, and the like. The GPU, under an instruction from the CPU 142, generates, in the VRAM, display image data for displaying various screens on the display 154 by using image generation data 324b (see FIG. 12) stored in the RAM 144, and outputs the generated display image data to the display 154.

The radio communicator 150 includes a radio communication circuit and the like, and performs a process of transmitting and receiving communication data transmitted and received to and from the image forming apparatus 12, based on a radio communication scheme conforming to a known communication standard.

It is noted that the electrical configuration of the user terminal 14 illustrated in FIG. 3 is merely an example, and is not limiting. For example, the user terminal 14 may be provided with a hardware operation button as another inputter. In FIG. 3, for simplicity of description, a component related to a call and the like is omitted.

Figure 4:
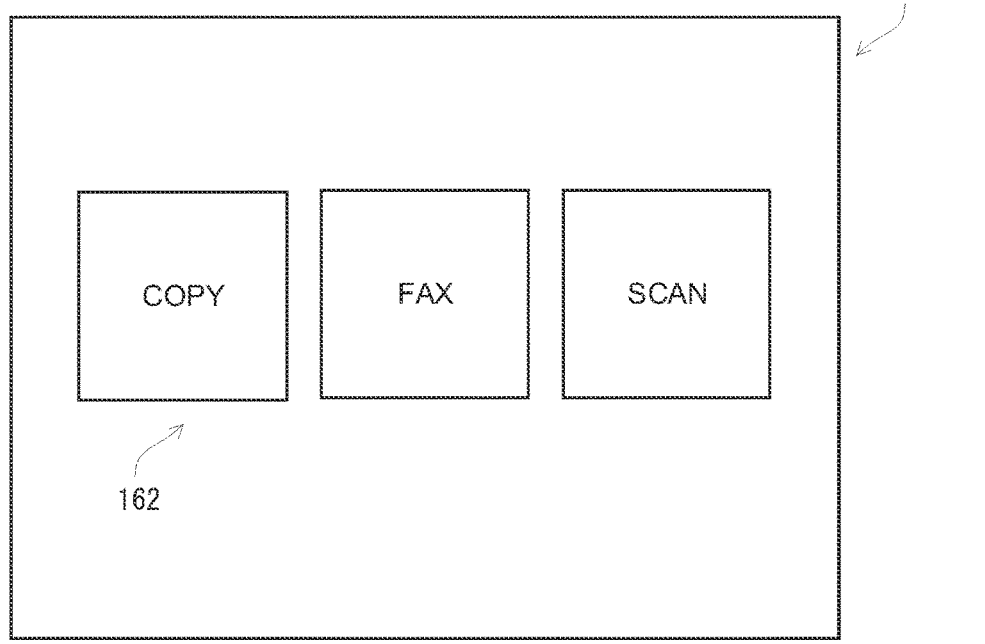
FIG. 4 is an illustrative view illustrating an example of a home screen of the image forming apparatus.

A basic operation example of the information processing system 10 will be described below with reference to FIGS. 4 and 5. If a main power source of the image forming apparatus 12 is turned on and the image forming apparatus 12 is in a standby state in which each function can be executed, the home screen 160 as illustrated in FIG. 4 is displayed on the display 132 of the image forming apparatus 12. As described above, the home screen 160 is a screen for selecting various types of jobs, and is an example of an operation screen. Images of a plurality of operation keys (selection keys) 162 for selecting jobs such as copy, fax, and scan are provided (displayed) on the home screen 160.

If the selection key 162 on the home screen 160 is touched (operated), a job assigned to the operated selection key 162 is selected, and the display 132 displays a setting screen for setting the job. A case where a copy job is selected will be described below as an example.

Figure 5:
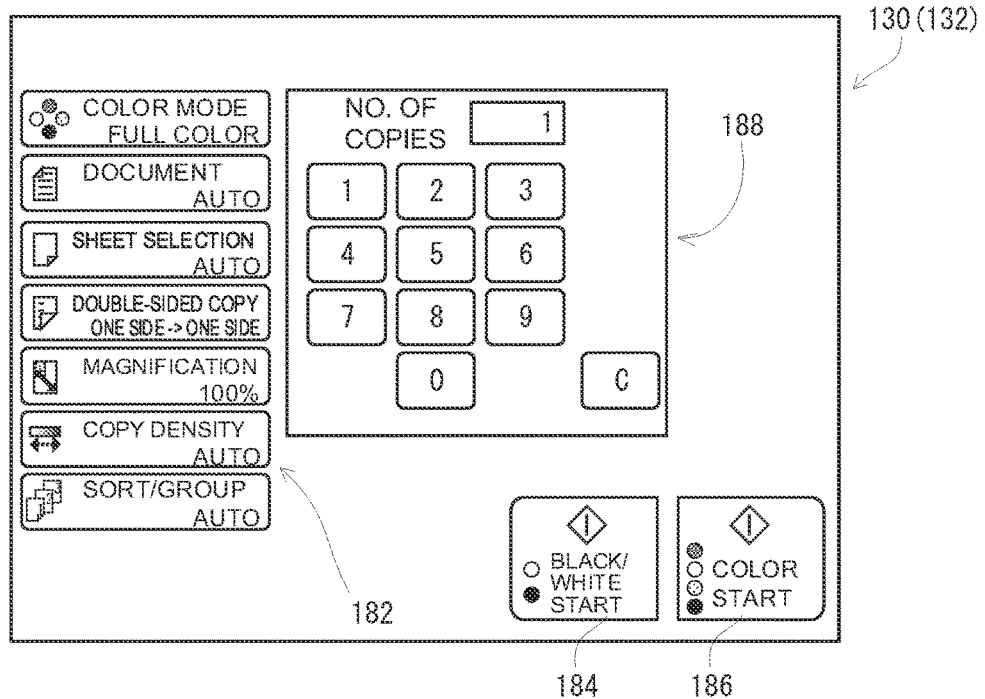
FIG. 5 is an illustrative view illustrating an example of a copy setting screen of the image forming apparatus.

If the selection key 162 to which the copy job is assigned is operated on the home screen 160 (if the copy job is selected), a copy setting screen 180 as illustrated in FIG. 5 is displayed on the display 132. The copy setting screen 180 is a screen for setting an operation condition of a copy job, and is an example of an operation screen.

The copy setting screen 180 includes operation keys such as a function selection key 182, a start key for black and white 184, a start key for color 186, and a numeric keypad 188.

The function selection key 182 is arranged at a left end of the copy setting screen 180. A plurality of the function selection keys 182 are provided and arranged side by side in an up-down direction. Each of the plurality of function selection keys 182 corresponds to an operation condition of the copy job or to a function related to the copy job. Specifically, each of the function selection keys 182 is assigned to a function for performing a detailed setting for each operation condition of color setting, document orientation, sheet selection, double-sided copy, magnification, copy density, and page aggregation.

The start key for black and white (hereinafter referred to as "black/white start key") 184 and the start key for color (hereinafter referred to as "color start key") 186 are displayed in a lower right corner area of the copy setting screen 180. The black/white start key 184 and the color start key 186 are keys for causing the image forming apparatus 12 to start a predetermined operation. If the black/white start key 184 is operated, black and white copying is started. If the color start key 186 is operated, color copying is started according to a color setting.

It is noted that a process for generating, from read image data, black/white or color output image data reflecting various types of settings and a black/white or color image formation process according to the output image data are already known and are different from the essential content of the invention of the present application, and thus, detailed description thereof will be omitted.

The numeric keypad 188 is a numeric key and is provided in the center of the copy setting screen 180. If the numeric keypad 188 is operated, an operated number is displayed in a numeric-key input display field at an upper side from the numeric keypad 188. That is, the number of copies is set.

It is noted that as mentioned above, a case where the copy job is selected on the home screen 160 is described above as an example. However, if a fax job is selected or if a scan job is selected, a setting screen necessary for setting an operation condition of the fax job or the scan job is displayed on the display 132, and it is possible to set the operation condition of the job and execute the job.

In some conventional information processing systems, an operation screen for operating an image forming apparatus is displayed on a user terminal capable of communicating with the image forming apparatus, and the image forming apparatus can be remotely operated by the user terminal. There is a conventional technique in which, among the operation keys included in the operation screen of the user terminal, a key not corresponding to any one of the operation keys included in the operation screen of the image forming apparatus to be operated is disabled.

However, in the above-mentioned conventional technique, among the operation keys included in the operation screen of the image forming apparatus to be operated, a key not corresponding to any one of the operation keys included in an operation screen for the standard machine model displayed on the user terminal, that is an operation key executable by the image forming apparatus and an operation key not executable with the operation screen for the user terminal, is not displayed. That is, in the above-mentioned conventional technique, there is a problem that some of the operation keys executable by the image forming apparatus cannot be utilized, and there is room for improvement in operability.

Thus, in the information processing system 10 according to the first embodiment, it is possible to operate an operation key not executable with an operation screen for the user terminal, that is, an operation function (operation key) executable by the image forming apparatus 12.

An operation example of the information processing system 10 will be described below with reference to FIGS. 6 to 10. First, in the information processing system 10 according to the present embodiment, an application program (hereinafter, referred to as a "remote operation application") for communicating with the image forming apparatus 12 and remotely operating the image forming apparatus 12 is stored in the user terminal 14. Briefly, if the remote operation application is executed, a remote operation screen for the user terminal for remotely operating the image forming apparatus 12 (hereinafter, sometimes simply referred to as a "remote operation screen") is displayed on the display 154 of the user terminal 14. Then, an operation instruction (remote operation instruction) according to a touch operation (user operation) on the remote operation screen is input from the user terminal 14 to the image forming apparatus 12. Upon receiving the remote operation instruction, the image forming apparatus 12 operates according to the operation instruction.

In the remote operation application according to the present embodiment, it is possible to utilize a plurality of types of remote operation screens. For example, in the remote operation application according to the present embodiment, it is possible to utilize a plurality of types of remote operation screens imitating input devices of various types of existing image forming apparatuses. The input devices of the image forming apparatuses include a type of input device that receives a user operation via a software key displayed on a touch panel display (software key-type input device), a type of input device that receives a user operation via a hardware key or a hardware keyboard (hard key-type input device), and a type of input device that uses both a software key and a hard key (combined type input device).

The image forming apparatus 12 includes an image forming apparatus for business use mainly used in an office and the like, and an image forming apparatus for public use mainly used in public facilities and the like. The expected user groups differ between the image forming apparatus for business use and the image forming apparatus for public use, and thus, specifications of the input devices significantly differ between the image forming apparatus for business use and the image forming apparatus for public use.

In the remote operation application, it is possible to utilize a remote operation screen including an operation area imitating a software key-type input device, a remote operation screen including an operation area imitating a hard key-type input device, a remote operation screen including an operation area imitating a combined type input device. Each of the remote operation screens corresponding to each type of input device includes a remote operation screen corresponding to an input device of an image forming apparatus for business use and a remote operation screen corresponding to an input device of an image forming apparatus for public use. In addition to the existing input devices, it is also possible to utilize a remote operation screen including an operation area dedicated to remote operation.

Figure 6:
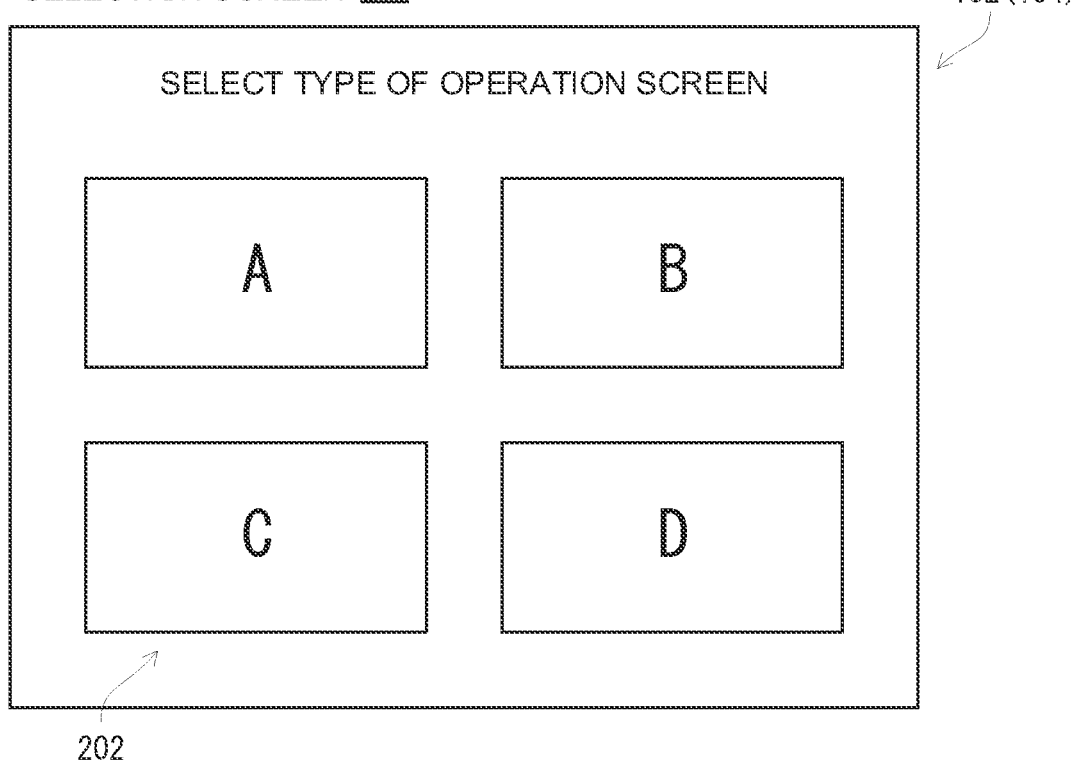
FIG. 6 is an illustrative view illustrating an example of a selection screen of the user terminal.

If the remote operation application is executed (launched), a selection screen 200 is displayed on the display 154 of the user terminal 14, as illustrated in FIG. 6. On the selection screen 200, an operation key (selection key) 202 for selecting a remote operation screen to be actually utilized is displayed from among a plurality of types of remote operation screens that can be utilized in the remote operation application. Although illustration is omitted, a character, a symbol, a figure, and the like indicating information related to a remote operation screen assigned to the selection key 202 may be displayed in the selection key 202. If the remote operation screen assigned to the selection key 202 corresponds to an input device of a specific model, a character, a symbol, a figure, and the like indicating information related to the model may be displayed.

If the selection key 202 on the selection screen 200 is operated, a remote operation screen assigned to the operated selection key 202 is selected. If the remote operation screen is selected, information about an operation function executable with the operated remote operation screen (specification information of the remote operation screen) is acquired. If the remote operation screen is selected, the user terminal 14 communicates with the image forming apparatus 12 to acquire information about an operation function executable with the input device 130 of the image forming apparatus 12 to be operated (specification information on the apparatus side). However, the user operation on the selection screen 200 is not an operation for remotely operating the image forming apparatus 12 (but an operation for an internal process of the user terminal 14), and thus, a remote operation instruction according to the user operation on the selection screen 200 is not input from the user terminal 14 to the image forming apparatus 12.

Figure 7:
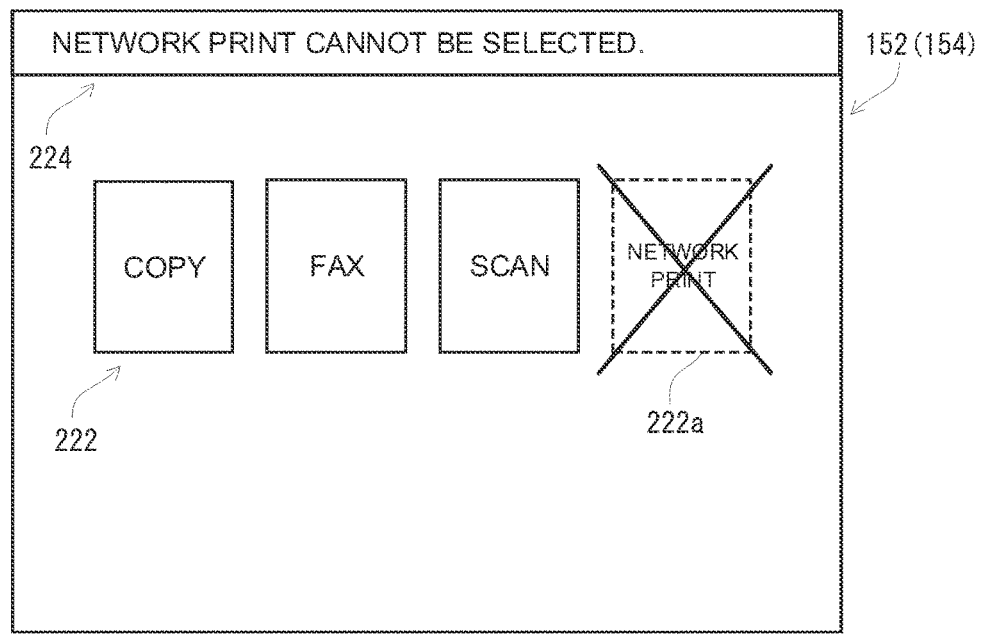
FIG. 7 is an illustrative view illustrating an example of a first remote operation screen of the user terminal.

If the remote operation screen is selected, the display 154 displays the type of remote operation screen that is operated. For example, as illustrated in FIG. 7, a first remote operation screen 220 is displayed on the display 154. The first remote operation screen 220 is a screen for selecting a desired job from various types of jobs executable by the image forming apparatus 12, and is a screen corresponding to the home screen 160 described above.

Images of operation keys (selection keys) 222 for selecting jobs such as copy, fax, scan, and network print are displayed on the first remote operation screen 220. The selection key 222 corresponds to the selection key 162 of the home screen 160.

However, if there is an operation function executable with the remote operation screen and not executable with the input device of the image forming apparatus to be operated (unusable function), that is, if there is an operation key (unusable key) executable with the remote operation screen and not executable with the input device of the image forming apparatus to be operated, the unusable key is disabled. For example, the image forming apparatus 12 to be operated in the present embodiment cannot execute a network print job. Thus, the input device 130 of the image forming apparatus 12 to be operated does not include a selection key for selecting a network print job. Therefore, on the first remote operation screen 220, a selection key 222a for selecting a network print job corresponds to an unusable key and is disabled.

The unusable key is displayed translucently and is displayed with a cross mark thereon to indicate that the operation key cannot be used. It is noted that instead of displaying the cross mark, the unusable key may be grayed out or may be displayed in a color with low luminance.

If there is an unusable key, a notifier 224 that notifies the existence of the unusable key is displayed on the remote operation screen. The notifier 224 may be displayed in a margin portion of the remote operation screen, or may be displayed in an overlapping manner (as a pop-up) on a front surface of the remote operation screen.

In the example illustrated in FIG. 7, the notifier 224 including a message indicating that a network print job cannot be selected is displayed on an upper end of the first remote operation screen 220.

If the selection key 222 on the first remote operation screen 220 is operated, a job assigned to the operated selection key 222 is selected, and the display 154 displays a remote operation screen corresponding to a setting screen for setting the job. If a user operation is received on the operation screen displayed after the first remote operation screen 220, a remote operation instruction according to the user operation (according to the function of the operated key) is input from the user terminal 14 to the image forming apparatus 12. A case where a copy job is selected will be described below as an example.

Figure 8:
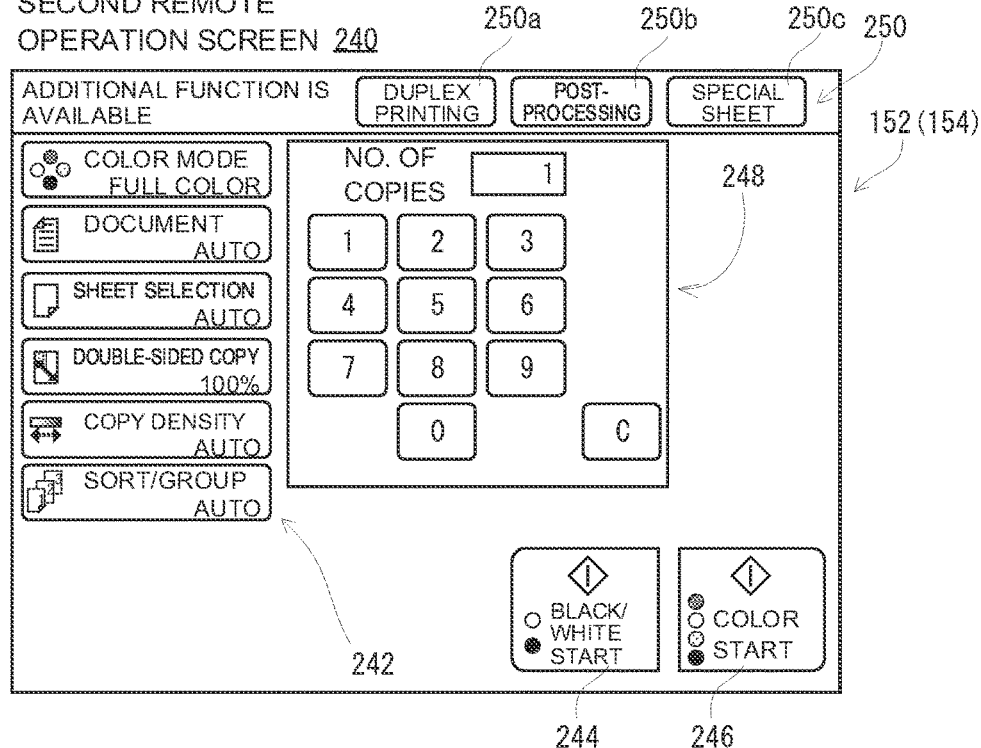
FIG. 8 is an illustrative view illustrating an example of a second remote operation screen of the user terminal.

If the selection key 222 to which the copy job is assigned is operated on the first remote operation screen 220 (if the copy job is selected), a second remote operation screen 240 as illustrated in FIG. 8 is displayed on the display 154. The second remote operation screen 240 is a screen for setting an operation condition of the copy job, and is a screen corresponding to the copy setting screen 180 described above.

The second remote operation screen 240 includes a function selection key 242, a start key for black and white 244, a start key for color 246, and a numeric keypad 248. The function selection key 242 corresponds to the function selection key 182, the start key for black and white 244 corresponds to the start key for black and white 184, the start key for color 246 corresponds to the start key for color 186, and the numeric keypad 248 corresponds to the numeric keypad 188. These operation keys are assigned to the same functions as the corresponding operation keys in the copy setting screen 180, and thus, detailed description thereof will be omitted.

For example, if any one of the start key for black and white 244 and the start key for color 246 is operated, a remote operation instruction to start a job is input to the image forming apparatus 12, the remote operation application is terminated, and the remote operation screen is hidden. It is noted that the remote operation application is also terminated if the remote operation screen is not operated for a continuous predetermined time period in a state where the remote operation screen is displayed. An end key for terminating the remote operation application may be provided on the remote operation screen. In this case, the remote operation application is terminated if the end key is operated.

However, if there is an operation function executable with the input device of the image forming apparatus to be operated and not executable with the remote operation screen in an initial state (additional function), that is, if there is an operation key executable with the input device of the image forming apparatus to be operated and not executable with the remote operation screen in the initial state (additional function key), a notification function of the additional function is enabled.

If the notification function of the additional function is enabled, the remote operation screen is provided with an additional function notifier for notifying a user of the existence of the additional function. For example, the image forming apparatus 12 to be operated in the present embodiment is capable of executing duplex printing, post-processing (for example, stapling processing, punching processing, paper folding processing, and the like) and special sheet copying in a copy job. On the other hand, the second remote operation screen 240 does not include operation keys corresponding to duplex printing, post-processing, and special sheet copying. Thus, in the present embodiment, a duplex printing function, a post-processing function, and a special sheet copy function correspond to the additional function, and operation keys corresponding to the duplex printing, the post-processing, and the special sheet copying correspond to the additional function key. Therefore, the second remote operation screen 240 is provided with an additional function notifier 250 for notifying the user of the existence of the duplex printing function, the post-processing function, and the special sheet copy function.

The additional function notifier 250 displays a message indicating that an additional function exists. The additional function notifier 250 displays additional function keys 250*a* to 250*c* for executing additional functions. That is, the additional function notifier 250 is also an extended operation section including the additional function keys 250*a* to 250*c* assigned to additional functions. For example, the additional function notifier 250 is displayed in a margin portion of the remote operation screen (a portion where an operation key other than the additional function keys is not arranged). In the present embodiment, the additional function notifier 250 is displayed on an upper end of the second remote operation screen 240.

Although illustration is omitted, if any one of the additional function keys 250*a* to 250*c* is operated, an additional function setting screen for setting an operation condition related to the additional function corresponding to the additional function key is displayed. The additional function setting screen may be displayed in another margin portion of the remote operation screen, or may be displayed in an overlapping manner on the front surface of the remote operation screen. The same applies to additional function keys 254*a* to 254*c* and 264*a* to 264*c* described later.

Figure 9:
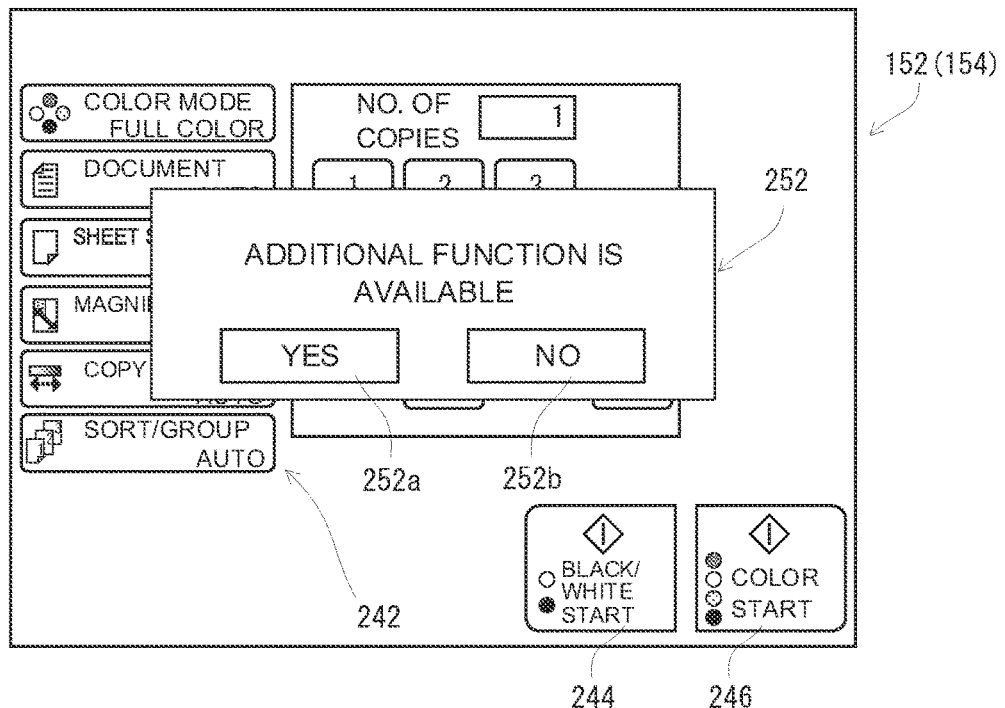
FIG. 9 is an illustrative view illustrating another example of the second remote operation screen of the user terminal.

It is noted that the example illustrated in FIG. 8 is merely an example, and as illustrated in FIG. 9, an additional function notifier 252 may be displayed in an overlapping manner on the front surface of the remote operation screen. In this case, the additional function notifier 252 displays a message indicating the existence of an additional function, a first key ("Yes" key) 252*a* for displaying an additional function key corresponding to the additional function, and a second key ("No" key) 252*b* for not displaying the additional function key corresponding to the additional function.

Figure 10:
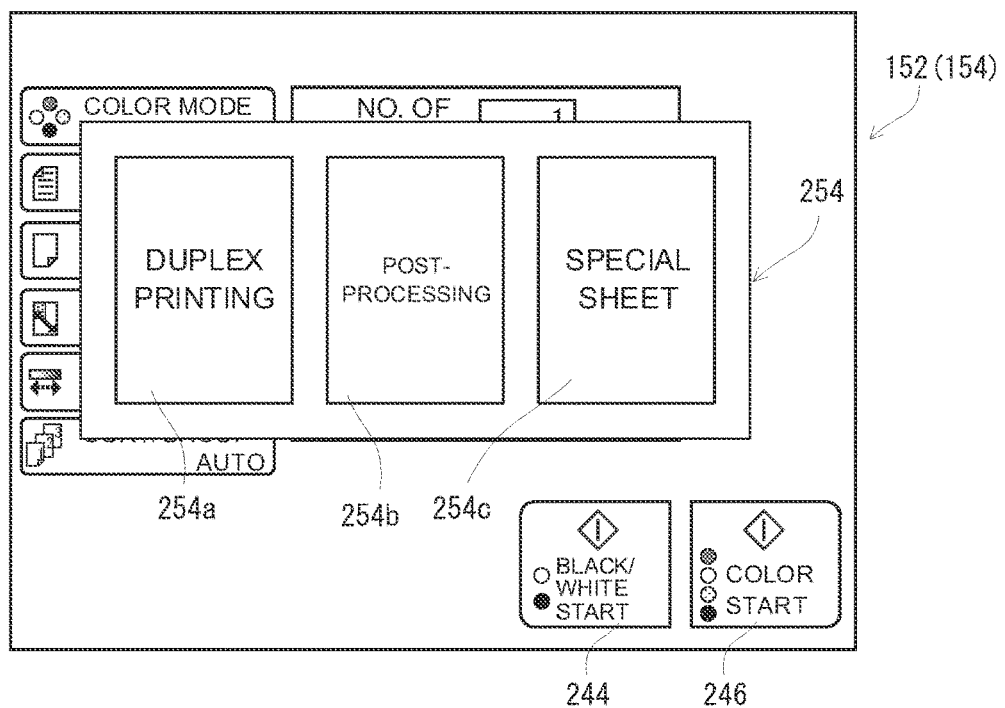
FIG. 10 is an illustrative view illustrating another example of the second remote operation screen of the user terminal.

If the first key 252*a* is operated, an extended operation section 254 including the additional function keys 254*a* to 254*c* is displayed, as illustrated in FIG. 10. The extended operation section 254 is displayed in an overlapping manner on the front surface of the remote operation screen. On the other hand, if the second key 252*b* is operated, the additional function notifier 252 is hidden. It is noted that in a state where the additional function notifier 252 is displayed, an operation other than an operation on the first key 252*a* or the second key 252*b* cannot be performed, and thus, another operation cannot be performed.

The above-described operation of the information processing system 10 is realized when the CPU 122 of the image forming apparatus 12 executes an information processing program for the image forming apparatus 12 stored in the RAM 124, and the CPU 142 of the user terminal 14 executes an information processing program for the user terminal 14 stored in the RAM 144. A specific process will be described below by using a flowchart.

Figure 11:
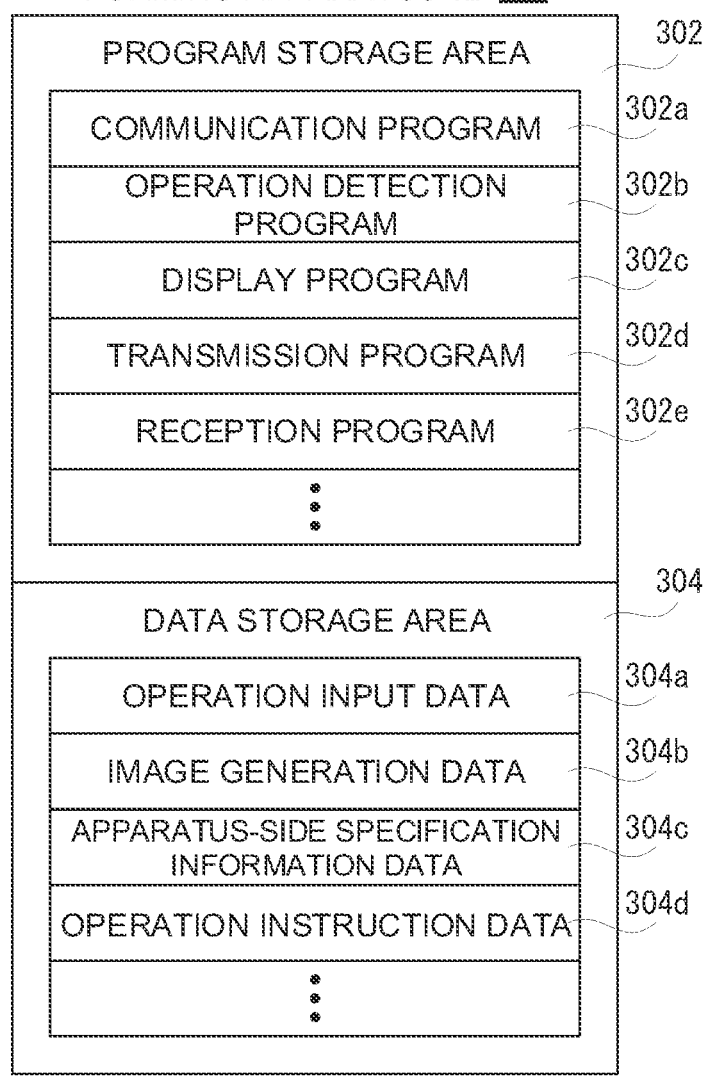
FIG. 11 is an illustrative view illustrating an example of a memory map of a RAM of the image forming apparatus illustrated in FIG. 1.

FIG. 11 is an illustrative view illustrating an example of a memory map 300 of the RAM 124 of the image forming apparatus 12 illustrated in FIG. 2. As illustrated in FIG. 11, the RAM 124 includes a program storage area 302 and a data storage area 304. As described above, an information processing program for the image forming apparatus 12 is stored in the program storage area 302 of the RAM 124. The information processing program for the image forming apparatus 12 includes a communication program 302*a*, an operation detection program 302*b*, a display program 302*c*, a transmission program 302*d*, and a reception program 302*e*.

The communication program 302*a* is a program for controlling the communicator 138 to communicate (transmit and receive) data by wire with an external computer via a network. The communication program 302*a* is also a program for controlling the communicator 138 to transmit and receive data to and from the user terminal 14 and another external computer via radio communication.

The operation detection program 302*b* is a program for detecting an input operation to the input device 130. For example, the operation detection program 302*b* is a program for acquiring touch coordinate data output from the input control circuit 126 when the touch panel is operated, and detecting that a software key displayed on the display 132 is operated. The operation detection program 302*b* is also a program for acquiring operation data output from the input control circuit 126 when a hardware key is operated, and detecting that the hardware key is operated.

The display program 302*c* is a program for generating display image data, that is, screen data such as the home screen 160 and the copy setting screen 180 described above, by using the image generation data 304*b* described later, and outputting the display image data to the display 132.

The transmission program 302*d* is a program for transmitting apparatus-side specification information data 304*c* to the user terminal 14. However, the communication program 302*a* is executed during transmission. The reception program 302*e* is a program for receiving operation instruction data transmitted from the user terminal 14. However, the communication program 302*a* is executed during reception.

Although illustration is omitted, the program storage area 302 also stores an image reading program, an image formation program, and the like. The image reading program is a program for controlling the image reader 136 to read an image of a document and outputting an image signal (read image data) corresponding to the read image. The image formation program is a program for controlling the image former 134 to print a multicolor image or a monochrome image onto a sheet. The program storage area 302 also stores a program and the like for selecting and executing various types of functions included in the image forming apparatus 12.

The data storage area 304 of the RAM 124 stores operation input data 304*a*, the image generation data 304*b*, the apparatus-side specification information data 304*c*, operation instruction data 304*d*, and the like.

The operation input data 304*a* is touch coordinate data and/or operation data detected according to the operation detection program 302*b*. The detected touch coordinate data and/or operation data is stored in time series in the data storage area 304. The image generation data 304*b* is data including image data of various types of operation keys for generating display image data corresponding to various types of screens displayed on the display 132. The apparatus-side specification information data 304*c* is data of information about an operation function executable with the input device 130 of the image forming apparatus 12 (information about an operation key executable with the input device 130). The operation instruction data 304*d* is data corresponding to operation instruction data 324*e* transmitted from the user terminal 14.

It is noted that although illustration is omitted, the data storage area 304 may store other data necessary for executing the information processing program for the image forming apparatus 12, or may be provided with a timer (counter) and a register necessary for executing the information processing program for the image forming apparatus 12.

Figure 12:
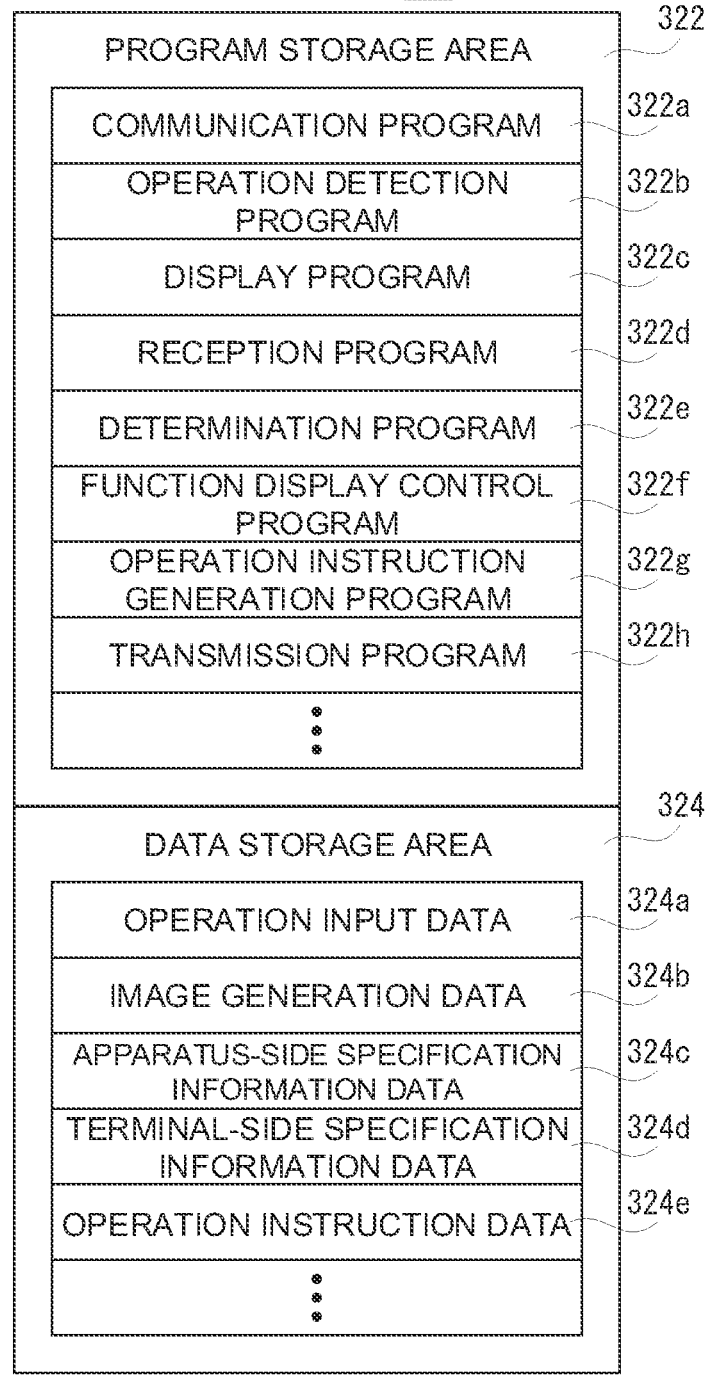
FIG. 12 is an illustrative view illustrating an example of a memory map of a RAM of the user terminal illustrated in FIG. 1.

FIG. 12 is an illustrative view illustrating an example of a memory map 320 of the RAM 144 of the user terminal 14 illustrated in FIG. 3. As illustrated in FIG. 12, the RAM 144 includes a program storage area 322 and a data storage area 324. As described above, the information processing program for the user terminal 14 is stored in the program storage area 322 of the RAM 144. The information processing program for the user terminal 14 includes a communication program 322*a*, an operation detection program 322*b*, a display program 322*c*, a reception program 322*d*, a determination program 322*e*, a function display control program 322*f*, an operation instruction generation program 322*g*, and a transmission program 322*h*.

The communication program 322*a* is a program for controlling a communicator 208 to directly transmit and receive data to and from the image forming apparatus 12 by using radio communication.

The operation detection program 322*b* is a program for detecting a touch input, and is a program for acquiring touch coordinate data output from the touch panel 152 and detecting that a software key included in various types of screens displayed on the display 154 is operated.

The display program 322*c* is a program for generating display image data, that is, screen data such as the above-mentioned remote operation screen, by using the image generation data 324*b* described later, and outputting the display image data to the display 154.

The reception program 322*d* is a program for receiving the apparatus-side specification information data 304*c* transmitted from the image forming apparatus 12. However, the communication program 322*a* is executed during reception.

The determination program 322*e* is a program for comparing specification information on the apparatus side indicated by apparatus-side specification information data 324*c* of the image forming apparatus to be operated with specification information of the remote operation screen indicated by terminal-side specification information data 324*d*, to determine whether there are an unusable function and an unusable key, and an additional function and an additional function key.

The function display control program 322*f* is a program for disabling an operation key corresponding to an unusable key among the operation keys displayed on the remote operation screen if there is an unusable function (unusable key). The function display control program 322*f* is a program for causing the remote operation screen to display an additional function notifier including an additional function key so that the additional function key can be operated if there is an additional function (additional function key).

The operation instruction generation program 322*g* is a program for generating the operation instruction data 324*e* for a remote operation instruction (remote operation command) corresponding to a touch operation on the remote operation screen.

The transmission program 322*h* is a program for transmitting the operation instruction data 324*e* to the image forming apparatus 12. However, the communication program 322*a* is executed during transmission.

It is noted that although illustration is omitted, the program storage area 322 also stores a program and the like for selecting and executing various types of functions provided in the user terminal 14.

The data storage area 324 of the RAM 144 stores operation input data 324*a*, the image generation data 324*b*, the apparatus-side specification information data 324*c*, the terminal-side specification information data 324*d*, the operation instruction data 324*e*, and the like.

The operation input data 324*a* is touch coordinate data detected according to the operation detection program 302*b*. The detected touch coordinate data is stored in time series in the data storage area 324. The image generation data 324*b* is data including polygon data and texture data for generating display image data corresponding to various types of screens displayed on the display 132. The apparatus-side specification information data 324*c* is data corresponding to the apparatus-side specification information data 304*c* transmitted from the image forming apparatus 12. The terminal-side specification information data 324*d* is data of information about an operation function executable from the beginning with the selected remote operation screen (information about an operation key executable with the remote operation screen in an initial state). The operation instruction data 324*e* is data about an operation instruction corresponding to a touch operation on the remote operation screen.

It is noted that although illustration is omitted, the data storage area 324 stores other data necessary for executing an information processing program for the user terminal 14, or is provided with a timer (counter) and a register necessary for executing the information processing program for the user terminal 14.

Figure 13:
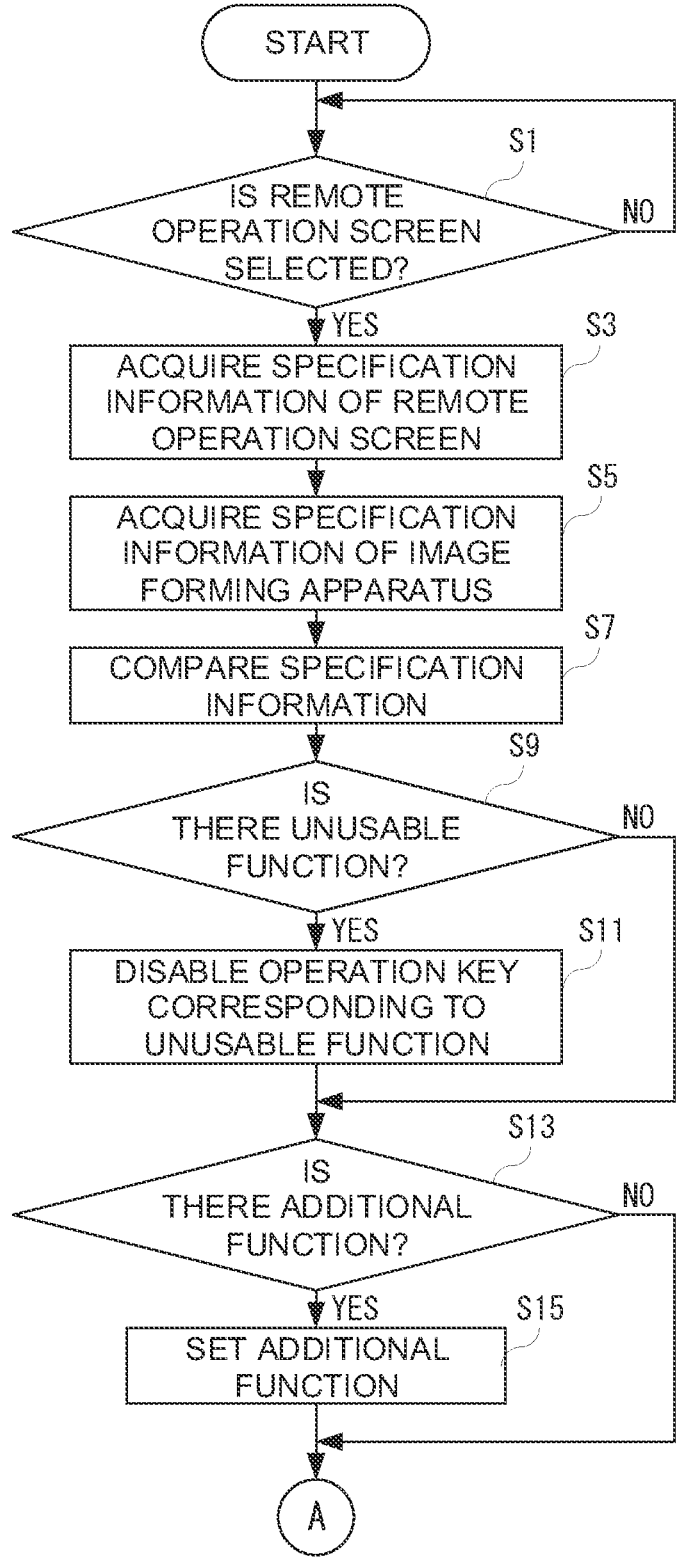
FIG. 13 is a flowchart illustrating a part of an example of a remote operation process of a CPU of the user terminal.

FIG. 13 is a flowchart illustrating an example of a remote operation process executed by the CPU 142 of the user terminal 14 illustrated in FIG. 3. The remote operation process is started when the remote operation application is executed (launched).

As illustrated in FIG. 13, when the CPU 142 of the user terminal 14 starts the remote operation process, the CPU 142 displays the selection screen 200 on the display 154 in step S1, and determines whether a remote operation screen to be utilized is selected from a plurality of types of remote operation screens that can be utilized in the remote operation application.

If "NO" is determined in step S1, that is, if it is determined that the remote operation screen to be utilized is not selected, the process returns to the same step S1. On the other hand, if "YES" is determined in step S1, that is, if it is determined that the remote operation screen to be utilized is selected, information about an operation function of the remote operation screen to be utilized, that is, specification information on the terminal side is acquired in step S3, and in step S5, information about an operation function of the image forming apparatus 12 to be operated, that is, specification information on the apparatus side is acquired, and the process proceeds to step S7.

Subsequently, in step S7, the specification information on the apparatus side and the specification information on the terminal side are compared, and in step S9, it is determined whether an unusable function (unusable key) exists. If "NO" is determined in step S9, that is, if it is determined that the unusable function does not exist, the process proceeds to step S13 described later. On the other hand, if "YES" is determined in step S9, that is, if it is determined that an unusable function exists, an operation key corresponding to the unusable function is disabled in step S11, and the process proceeds to step S13.

In step S13, it is determined whether an additional function (additional function key) exists. If "NO" is determined in step S13, that is, if it is determined that the additional function does not exist, the process proceeds to step S17 illustrated in FIG. 14. On the other hand, if "YES" is determined in step S13, that is, if it is determined that the additional function exists, a notification function of the additional function is enabled in step S15, and the process proceeds to step S17.

Figure 14:
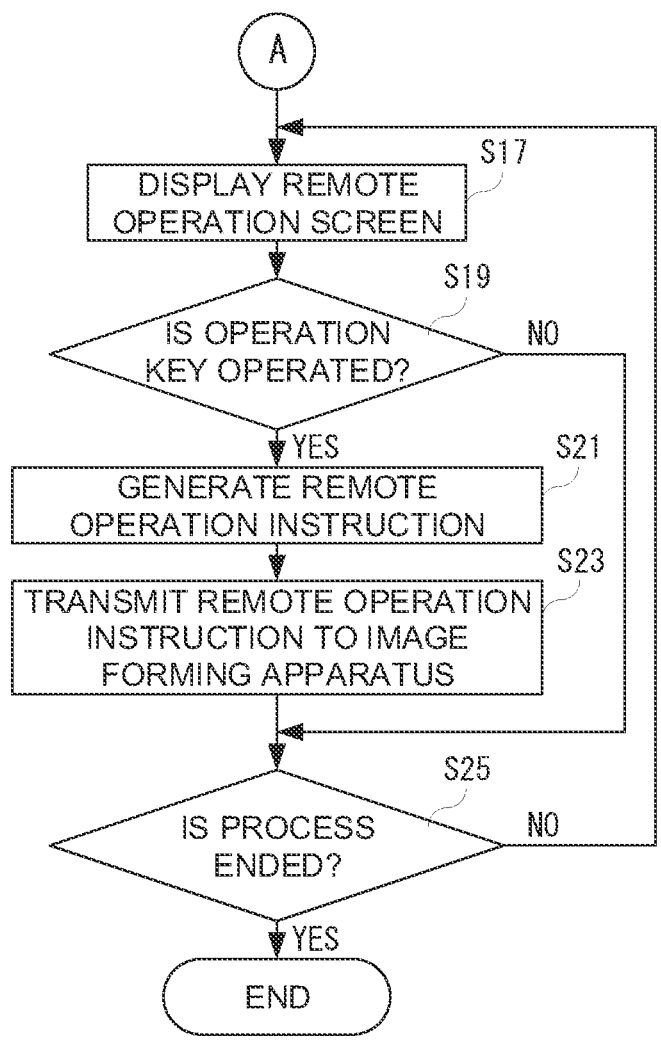
FIG. 14 is a flowchart that is a part of the remote operation process and continues after FIG. 13.

As illustrated in FIG. 14, in step S17, the remote operation screen is displayed on the display 154, and in step S19, it is determined whether the operation key is operated. If "NO" is determined in step S19, that is, if it is determined that the operation key is not operated, the process proceeds to step S25 described later. On the other hand, if "YES" is determined in step S19, that is, if it is determined that the operation key is operated, a remote operation instruction is generated according to a function assigned to the operated operation key in step S21, the remote operation instruction is transmitted to the image forming apparatus 12 in step S23, and the process proceeds to step S25. In step S25, it is determined whether to terminate the remote operation process. If "NO" is determined in step S25, the process returns to step S17. On the other hand, if "YES" is determined in step S25, the remote operation process is terminated.

In the first embodiment, the additional function notifier is provided for notifying the user of the existence of an additional function that is an operation function executable with the input device 130 of the image forming apparatus 12 to be operated, and is not executable with the remote operation screen in the initial state. Thus, the user can recognize the existence of the additional function, and it is possible to improve the operability of the user terminal 14 for remotely operating the image forming apparatus 12.

In the first embodiment, the extended operation section including the additional function key assigned to the additional function is displayed on the remote operation screen. Therefore, the user can execute the additional function, and thus, it is possible to improve the operability of the user terminal 14 for remotely operating the image forming apparatus 12.

Second Embodiment

The information processing system 10 according to the second embodiment is the same as in the first embodiment, except that the remote operation screen includes an operation area 260 imitating the input device 130 of the image forming apparatus 12 and a margin area 262 that is a portion other than the operation area 260, and the extended operation section is displayed in the margin area 262. Thus, contents different from the first embodiment will be described, but duplicated parts of the description will be omitted.

In the information processing system 10, the longitudinal/lateral ratio (aspect ratio) may differ between the display 132 of the image forming apparatus 12 and the display 154 of the user terminal 14. For example, a display having an aspect ratio of 4:3 (square screen) may be employed for the display 132 of the image forming apparatus 12, and a display having an aspect ratio of 16:9 (wide screen) may be employed for the display 154 of the user terminal 14. As described above, if the aspect ratio differs between the display 132 of the image forming apparatus 12 and the display 154 of the user terminal 14, the remote operation screen (second remote operation screen 240) includes the operation area 260 imitating the input device 130 of the image forming apparatus 12 and the margin area 262 that is a portion other than the operation area 260, as illustrated in FIG. 15.

Figure 15:
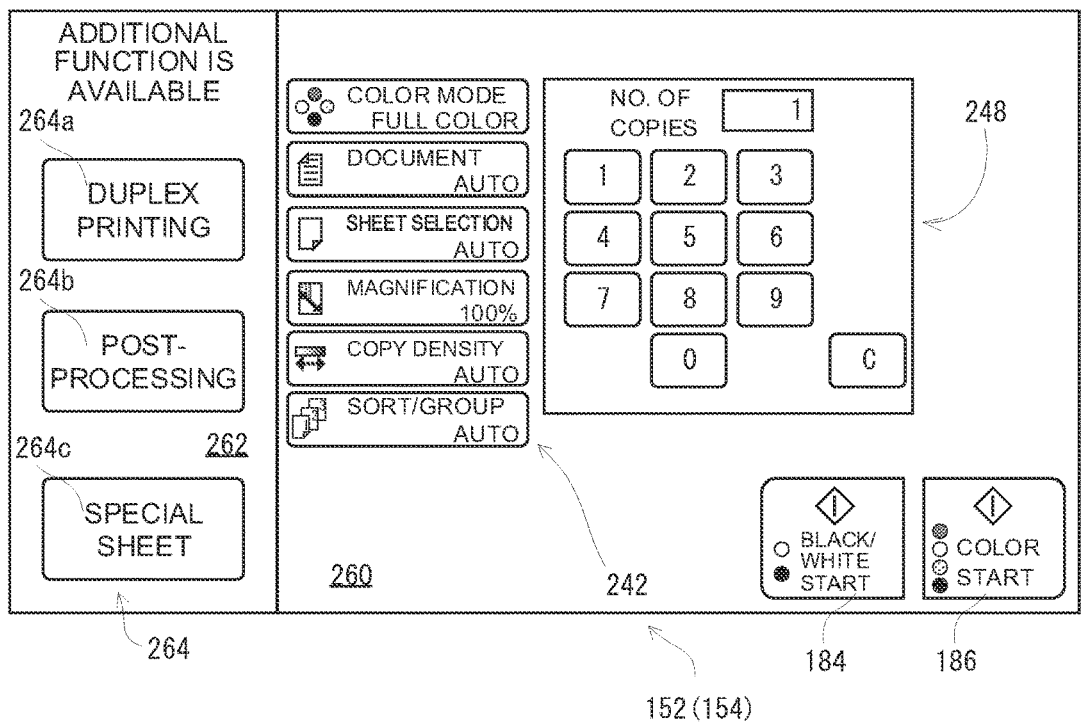
FIG. 15 is an illustrative view illustrating an example of a second remote operation screen according to a second embodiment.

It is noted that in the example illustrated in FIG. 15, the aspect ratio of the display 132 of the image forming apparatus 12 is 4:3, and the aspect ratio of the display 154 of the user terminal 14 is 16:9. In this case, the margin area 262 is generated at one end in a longitudinal direction of the display 154 of the user terminal 14. On the other hand, although illustration is omitted, if the aspect ratio of the display 132 of the image forming apparatus 12 is 16:9 and the aspect ratio of the display 154 of the user terminal 14 is 4:3, a margin area is generated at one end in a lateral direction of the display 154 of the user terminal 14.

A message indicating that an additional function exists (the additional function notifier) and an extended operation section 264 including the additional function keys 264a to 264c are displayed in the margin area 262. Therefore, the additional function keys can be operated without changing the layout of the operation area 260 imitating the input device 130 of the image forming apparatus 12.

Figure 16:
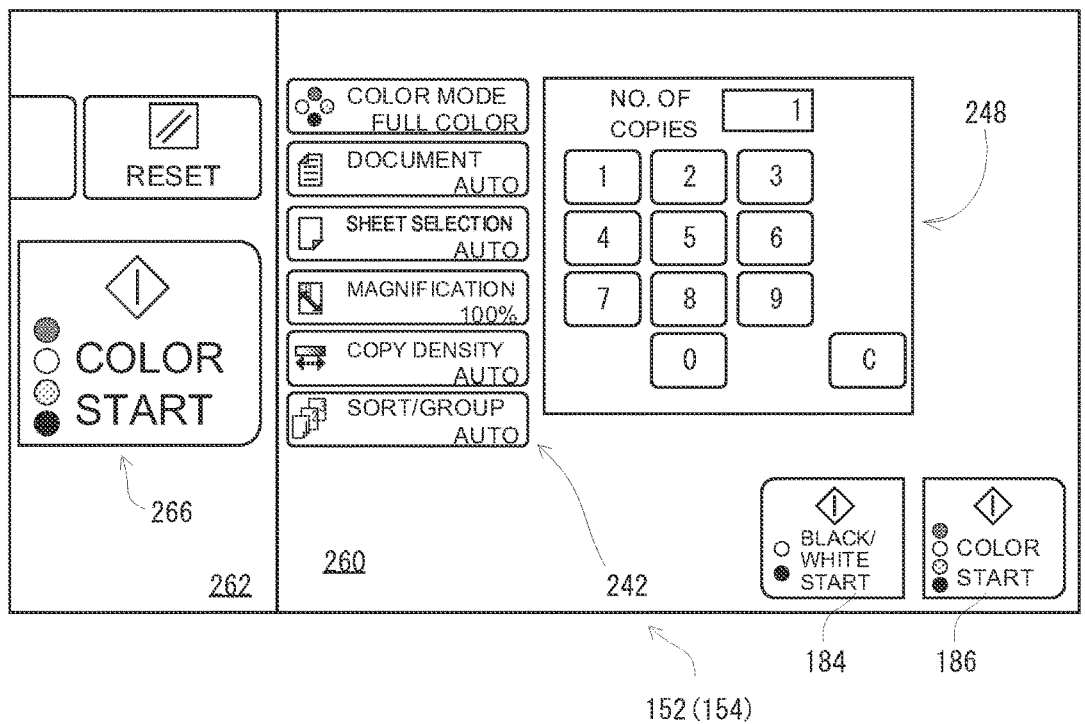
FIG. 16 is an illustrative view illustrating another example of the second remote operation screen according to the second embodiment.

As illustrated in FIG. 16, an enlarged image 266 in which a part of the operation area 260 is enlarged may be displayed in the margin area 262. That is, the remote operation screen of the second embodiment includes a first display mode in which the extended operation section 264 is displayed in the margin area 262 and a second display mode in which the enlarged image 266 is displayed in the margin area 262. The first display mode is used as an initial setting (default), and the display mode is switched when a predetermined user operation (display mode switching operation) is received. The display mode switching operation is not an operation for remotely operating the image forming apparatus 12, and thus, an operation instruction for the display mode switching operation is not input from the user terminal 14 to the image forming apparatus 12.

In the second embodiment, to realize the above-described operation, the information processing program for the user terminal 14 includes an enlarged image generation program for generating image data (enlarged image data) of the enlarged image 266 in which a part of the operation area 260 is enlarged, in the margin area 262, and the like. The display program 322c is also a program for outputting the enlarged image data to the display 154.

A remote operation process according to the second embodiment will be described below by using a flowchart. The same reference numerals are assigned to the same processes as those in the remote operation process described in the first embodiment, and duplicated content will not be omitted or simply described.

Figure 17:
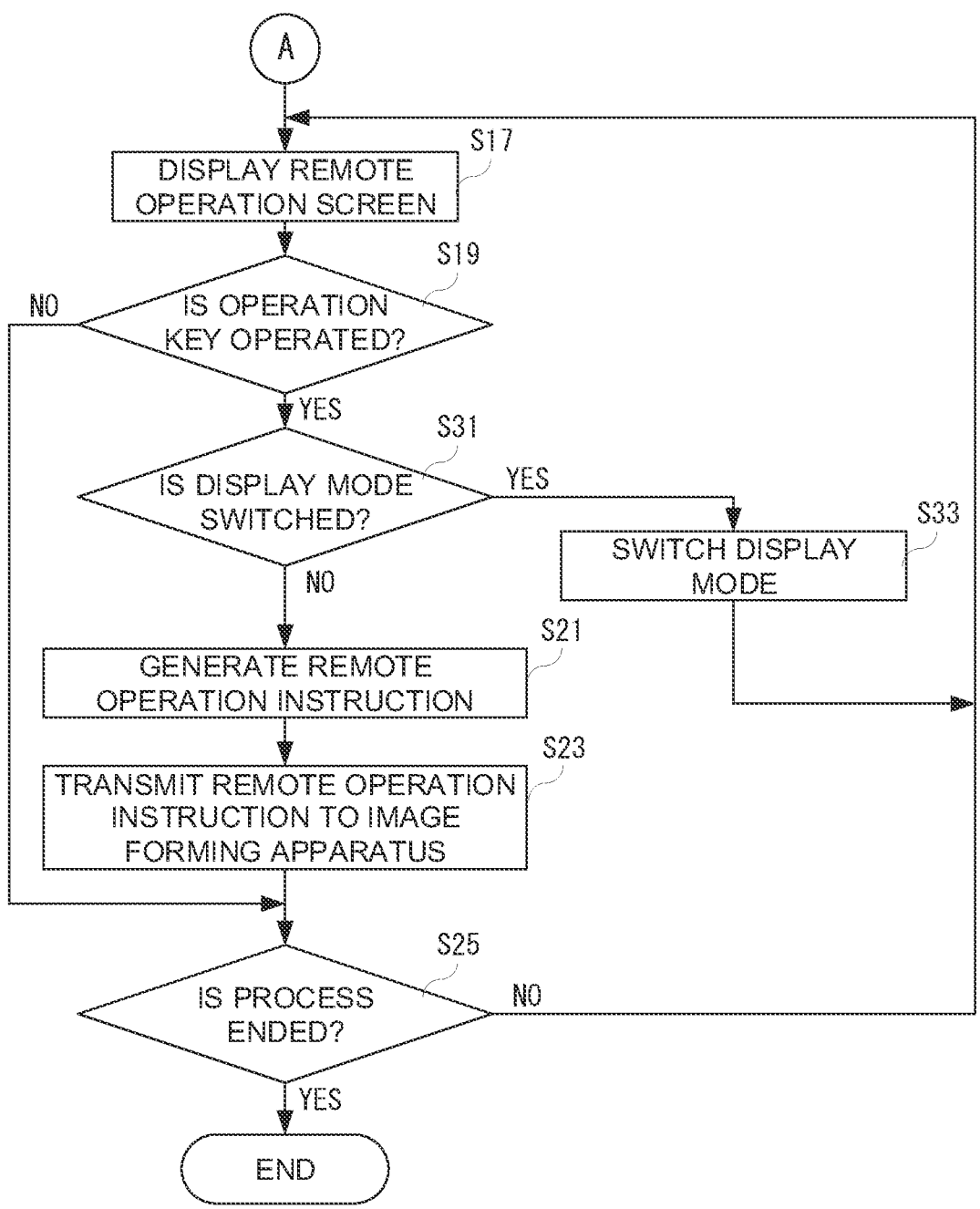
FIG. 17 is a flowchart illustrating a part of an example of a remote operation process according to the second embodiment.

FIG. 17 is a flowchart illustrating an example of the remote operation process according to the second embodiment. As illustrated in FIG. 17, the CPU 142 of the user terminal 14 starts the remote operation process, and if "YES" is determined in step S19, it is determined in step S31 whether the display mode is switched, that is, whether a switching operation of the display mode is received. If "NO" is determined in step S31, that is, if it is determined that the switching operation of the display mode is not received, the process proceeds to step S21. On the other hand, if "YES" is determined in step S31, that is, if it is determined that the switching operation of the display mode is received, the display mode is switched in step S33 and the process returns to step S17.

It is noted that the contents in the processes from step S1 to step S25 are the same as those in the first embodiment, and thus, detailed description thereof will be omitted.

According to the second embodiment, the additional function keys can be operated without changing the layout of the operation area 260 imitating the input device 130 of the image forming apparatus 12, and thus, it is possible to improve the operability of the user terminal 14 for remotely operating the image forming apparatus 12.

Third Embodiment

The information processing system 10 in the third embodiment is the same as in the first embodiment except that a content of an operation on the remote operation screen is stored as a routine operation, and thus, content different from the first embodiment will be described, but duplicated parts of the description will be omitted.

In the third embodiment, a content of an operation on the remote operation screen may be stored as a routine operation. However, the content of the operation on the remote operation screen is the content of a series of operations from a time when a type of the remote operation screen is selected until the remote operation application is terminated.

Although illustration is omitted, when the remote operation application is terminated, the user is presented with an option of whether to store the operation content as a routine operation, and if the user performs an operation for storing the operation content as a routine operation, the operation content is stored as a routine operation. The remote operation screen is provided with an operation key (routine operation read key) for reading a routine operation, and if the routine operation read key is operated, stored routine operations are displayed in a list, and the routine operations can be selectively read. When a routine operation to be read is determined, an operation instruction according to the content of the routine operation is transmitted to the image forming apparatus 12.

In the third embodiment, to realize the above-described operation, the information processing program for the user terminal 14 includes a storage program and the like for storing the content of the operation on the remote operation screen as a routine operation. It is noted that data of the routine operation (routine operation data) may be stored in the storage 156 of the user terminal 14, or may be stored in a storage (for example, the storage 118 of the image forming apparatus 12) of an external computer capable of communicating with the user terminal 14.

A remote operation process according to the third embodiment will be described below by using a flowchart. The same reference numerals are assigned to the same processes as those in the remote operation process described in the first embodiment, and duplicated content will not be omitted or simply described.

Figure 18:
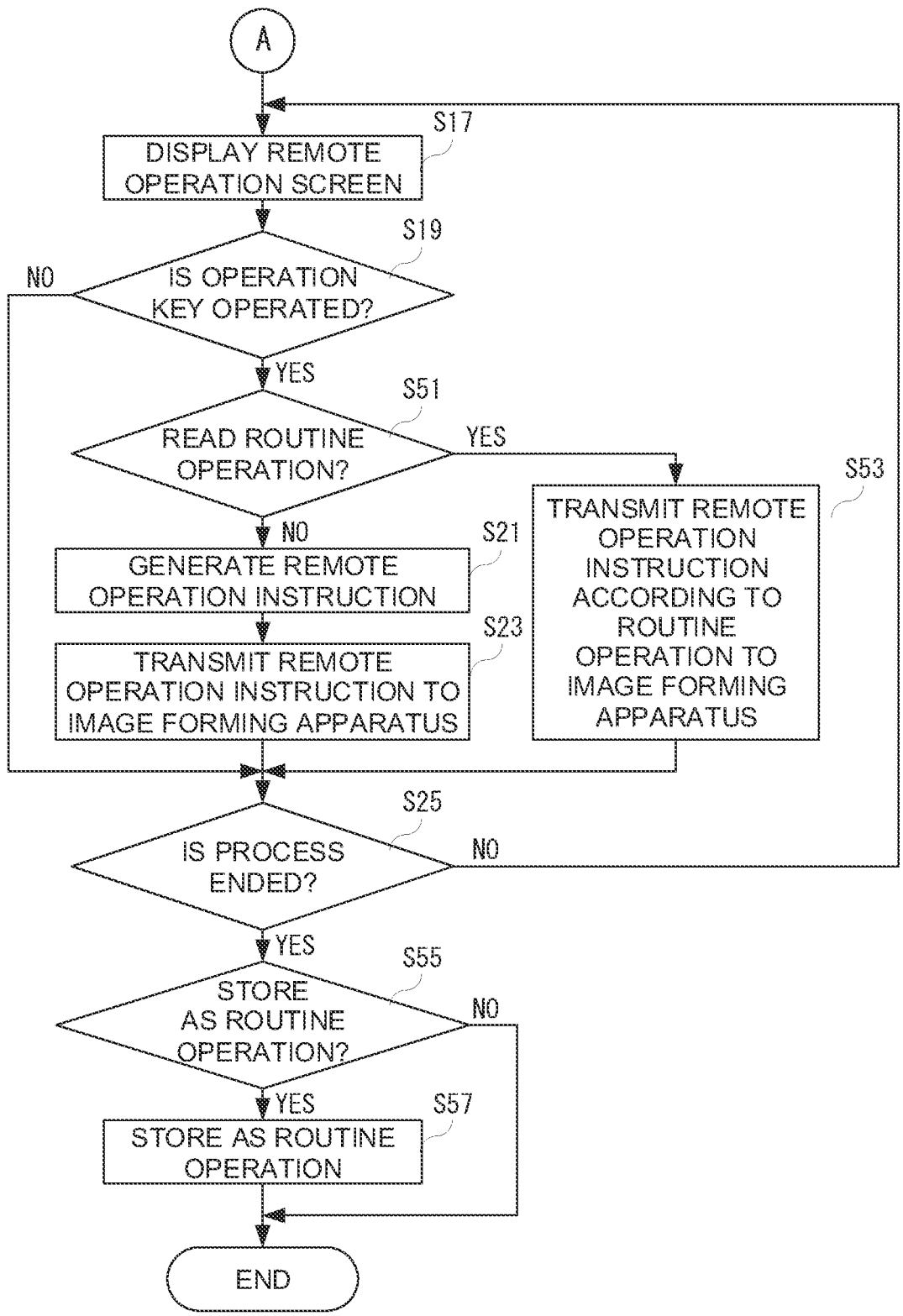
FIG. 18 is a flowchart illustrating a part of an example of a remote operation process according to a third embodiment.

FIG. 18 is a flowchart illustrating an example of the remote operation process according to the third embodiment. As illustrated in FIG. 18, when the remote operation process is started, if "YES" is determined in step S19, the CPU 142 of the user terminal 14 determines in step S51 whether to read a routine operation. If "NO" is determined in step S51, that is, if the CPU 142 determines not to read a routine operation, the process proceeds to step S21. On the other hand, if "YES" is determined in step S51, that is, if the CPU 142 determines to read a routine operation, in step S53, an operation instruction corresponding to the content of the routine operation is transmitted to the image forming apparatus 12, and the process proceeds to step S25.

If "YES" is determined in step S25, it is determined in step S55 whether to store the content of the operation on the remote operation screen as a routine operation. If "YES" is determined in step S55, that is, if it is determined that the content of the operation on the remote operation screen is to be stored as a routine operation, the content of the operation on the remote operation screen is stored as a routine operation in step S57, and the remote operation process is terminated. On the other hand, if "NO" is determined in step S55, that is, if it is determined that the content of the operation on the remote operation screen is not to be stored as a routine operation, the remote operation process is terminated without passing through step S57.

It is noted that the contents in the processes from step S1 to step S25 are the same as those in the first embodiment, and thus, detailed description thereof will be omitted.

In the third embodiment, it is possible to store the content of the operation on the remote operation screen as a routine operation, and to read and execute the routine operation. Therefore, the operation is simple when the same operation is repeated, and the same operation can be executed regardless of a type of the input device 130 of the image forming apparatus 12, and thus, it is possible to improve the operability of the user terminal 14 for remotely operating the image forming apparatus 12.

It is noted that an aspect illustrated in the third embodiment can be adopted in combination with the second embodiment.

The numerical values, the screens, the specific configurations, and the like described in the above embodiments are merely examples, and may be appropriately changed according to an actual product. The order in which each step in the flowcharts illustrated in the above embodiments is processed may be appropriately changed as long as the same result is obtained.

What is claimed is:

1. A mobile terminal including a display, a touch panel provided on a display surface of the display, a storage that stores a remote operation screen for the mobile terminal for remotely operating an information processing apparatus to be operated, and a communicator that communicates with the information processing apparatus, the mobile terminal comprising:
 a display controller that displays the remote operation screen on the display;
 a transmitter that transmits, to the information processing apparatus, an operation instruction corresponding to an input operation on the remote operation screen;
 a first determiner that compares an operation function executable with an input device of the information processing apparatus with an operation function executable with the remote operation screen in an initial state, and determines whether there is an additional function that is an operation function executable by the information processing apparatus, and is not executable with the remote operation screen in the initial state; and
 a notifier that notifies existence of the additional function, on the remote operation screen if the first determiner determines that there is the additional function.

2. The mobile terminal according to claim 1, wherein the display controller displays an extended operation section including an operation key assigned to the additional function, on the remote operation screen.

3. The mobile terminal according to claim 2, wherein the display controller displays the extended operation section to overlap on a part of the remote operation screen.

4. The mobile terminal according to claim 2, wherein the remote operation screen includes an operation area imitating the input device of the information processing apparatus and a margin area being a portion other than the operation area, and
 the display controller displays the extended operation section, in the margin area.

5. The mobile terminal according to claim 4, wherein the display controller displays an enlarged image obtained by enlarging a part of the operation area, in the margin area.

6. The mobile terminal according to claim 1, further comprising: an operation storage that stores a content of an operation on the remote operation screen as a routine operation in the storage; and
 a second determiner that determines whether to read the routine operation stored in the storage, wherein
 the transmitter transmits, to the information processing apparatus, an operation instruction corresponding to the routine operation if the second determiner determines to read the routine operation.

7. The mobile terminal according to claim 1, further comprising: a third determiner that compares an operation function executable with an input device of the information processing apparatus with an operation function executable with the remote operation screen and determines whether there is an unusable function that is an operation function executable with the remote operation screen, and is not executable by the information processing apparatus; and
 a disabler that disables the unusable function on the remote operation screen if the third determiner determines that there is the unusable function.

8. A non-transitory storage medium for storing a control program of a mobile terminal including a display, a touch panel provided on a display surface of the display, a storage that stores a remote operation screen for remotely operating an information processing apparatus to be operated, and a communicator that communicates with the information processing apparatus,
 the control program causing a processor of the information processing apparatus to execute:
  displaying the remote operation screen on the display;
  transmitting, to the information processing apparatus, an operation instruction corresponding to an input operation on the remote operation screen;
  comparing an operation function executable with an input device of the information processing apparatus with a basic operation function executable with the remote operation screen in an initial state and determining whether there is an additional function that is an operation function executable by the information processing apparatus, and is not executable with the remote operation screen in the initial state; and
  notifying existence of the additional function, on the remote operation screen if it is determined that there is the additional function in the comparing and determining.

9. A control method for a mobile terminal including a display, a touch panel provided on a display surface of the display, a storage that stores a remote operation screen for remotely operating an information processing apparatus to be operated, and a communicator that communicates with the information processing apparatus, the control method comprising:
 (a) displaying the remote operation screen on the display;
 (b) transmitting, to the information processing apparatus, an operation instruction corresponding to an input operation on the remote operation screen;
 (c) comparing an operation function executable with an input device of the information processing apparatus with a basic operation function executable with the remote operation screen in an initial state and determining whether there is an additional function that is an operation function executable by the information processing apparatus, and is not executable with the remote operation screen in an initial state; and
 (d) notifying existence of the additional function, on the remote operation screen if it is determined in the (c) that there is the additional function.

* * * * *